(No Model.)

W. P. SWEETLAND.
NUT LOCK.

No. 472,489.  Patented Apr. 5, 1892.

WITNESSES:
Fred G. Dieterich
Jos. A. Ryan

INVENTOR:
William P. Sweetland
BY Munn & Co.
ATTORNEYS

UNITED STATES PATENT OFFICE.

WILLIAM P. SWEETLAND, OF SAN FRANCISCO, CALIFORNIA.

NUT-LOCK.

SPECIFICATION forming part of Letters Patent No. 472,489, dated April 5, 1892.

Application filed November 18, 1890. Serial No. 371,872. (No model.)

*To all whom it may concern:*

Be it known that I, WILLIAM P. SWEETLAND, of San Francisco, in the county of San Francisco and State of California, have invented a new and useful Improvement in Nut-Locks, of which the following is a specification.

This invention relates to an improved base-washer nut-lock which is adapted for use upon railroads, machinery, wooden structures, &c.; and the object of the invention is to produce a lock of this class that shall be exceedingly cheap, easy of manufacture and application, durable, and safe in action.

The invention consists in certain details of construction and combination of parts whereby the various objects are accomplished, as will be more fully described, and pointed out in the appended claim.

Figure 1:
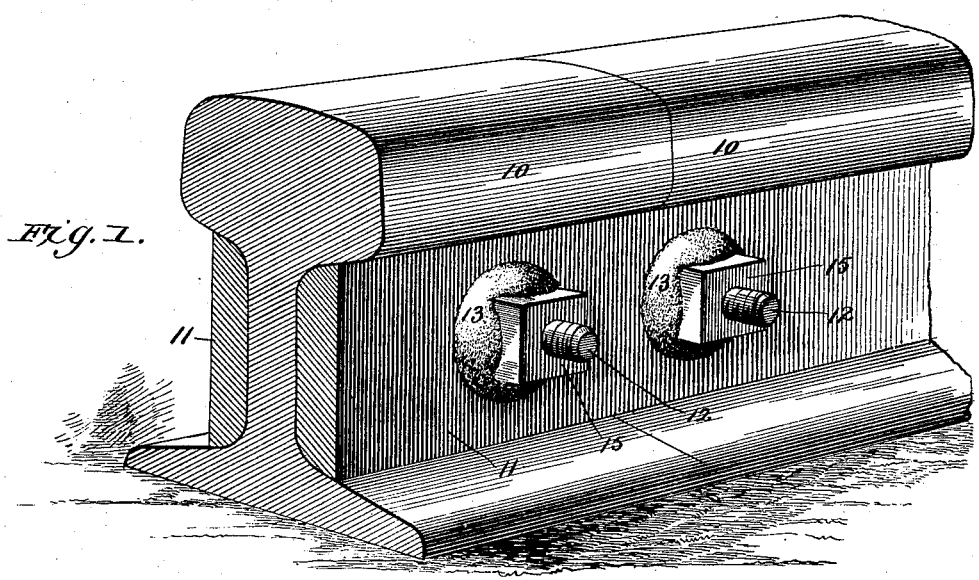
Figure 2:
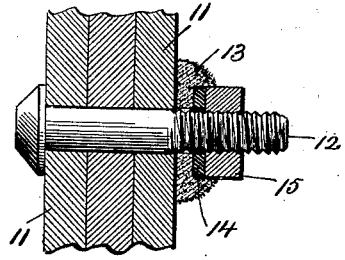
Figures 3, 5:
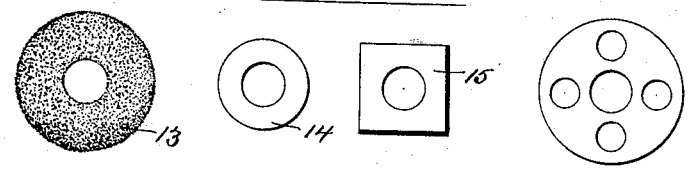
Figure 4:
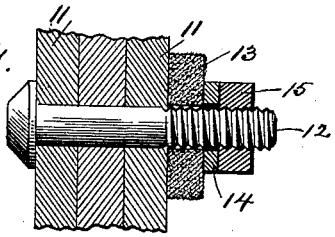

In the drawings, Figure 1 is a perspective of my improvement. Fig. 2 is a transverse section of the same. Fig. 3 is a detail view of the several parts detached. Fig. 4 is a section showing arrangement of parts previous to tightening, and Fig. 5 is a modified form of metallic washer.

Referring to the drawings, 10 10 indicate two meeting rails connected by the fish-plates 11, the bolts 12 being passed through the fish-plates and rails in the usual manner. An elastic non-metallic washer 13 is placed upon the threaded end of each bolt and pressed down until it rests upon the fish-plate. This washer 13 may be of rubber or any fibrous material, and in practice I have found felt of a fine quality to answer my purpose very well indeed. Before the washer is applied, however, it is thoroughly saturated or impregnated with some suitable preservative compound, such as white lead and oil, red lead and oil, or litharge and oil, all of which compounds are adhesive and harden when they dry. A metallic washer 14, preferably circular in shape, is placed, also, upon each bolt and rests upon the non-metallic washer, the washer 14 having a diameter equal to or less than the diameter of the securing-nut 15, while the non-metallic washer 13 has a diameter equal to or greater than the diagonal of said nut.

The securing-nut 15 is threaded upon the bolts and forces the metallic washer 14 into the elastic non-metallic washer 13, compressing the portion of the elastic washer beneath the metallic washer, and as the elastic washer is of greater diameter than the nut the overlapping edges will remain uncompressed and partially embrace the sides and corners of the nuts, as clearly shown, and as these washers are treated with a preservative compound which hardens when dry they lock the nut in place with such rigidness that a wrench is necessary in order to remove the same.

The elastic non-metallic washer does not communicate the vibratory motion or jar of the rail and plate to the nut, but acts as a non-conductor, taking up such motion, thereby preventing the nuts working loose. The washer being elastic will expand to fill any vacant space that might occur should the nut be accidentally moved forward or upward on the thread.

By making the metallic washer smaller than the non-metallic composite or fibrous washer the overlapping edges of the non-metallic washer embrace the sides and corners of the nut, thereby preventing rotation of the same, and as each washer is saturated with a hardening preservative compound the washer is given a positive locking quality and rendered very durable, and the washer also adheres strongly to the plate, bar, or beam against which it rests. This also prevents the non-metallic washer from turning.

In Fig. 5 I have shown a modified form of metallic washer, whereby said washer may be made the same size as the non-metallic one, the non-metallic substance being pressed through the apertures and bent against the nut.

Coal-tar has been found to be a desirable filling compound, and may be applied at the time of making the washers or just before their application.

Having thus described my invention, what I claim is—

In a nut-lock, the combination, with a bolt, of a felt washer impregnated with a hardening preservative compound, a metallic washer of less diameter than the felt washer arranged upon said felt washer, and a nut, also of a diameter less than the felt washer, arranged upon the metallic washer, substantially as shown and described.

WILLIAM P. SWEETLAND.

Witnesses:
I. P. TRUMPOUR,
JNO. W. JOHNSON.